United States Patent [19] [11] 4,198,516
Merlo et al. [45] Apr. 15, 1980

[54] ISATIN-DERIVED DISPERSED DYES

[75] Inventors: Fabrizio Merlo, Saronno; Giorgio Bornengo, Novara, both of Italy

[73] Assignee: Montedison S.p.A., Milan, Italy

[21] Appl. No.: 7,582

[22] Filed: Jan. 29, 1979

[30] Foreign Application Priority Data

Feb. 2, 1978 [IT] Italy ............................. 19897 A/78

[51] Int. Cl.² ......................................... C07D 403/06
[52] U.S. Cl. ..................................... 548/327; 8/179
[58] Field of Search ..................... 548/327; 260/325 R

[56] References Cited
U.S. PATENT DOCUMENTS

| | | | |
|---|---|---|---|
| 3,646,033 | 2/1972 | Leister et al. | 548/327 |
| 4,002,635 | 2/1977 | Frey | 548/327 |

OTHER PUBLICATIONS

L'Eplattenier et al., Helv. Chim. Acta, 1977, vol. 60, pp. 697–709.
Rappoport, The Chemistry of the Cyano Group, pp. 105–106, N.Y., Interscience-Wiley, 1970.

*Primary Examiner*—Natalie Trousof
*Attorney, Agent, or Firm*—Morgan, Finnegan, Pine, Foley & Lee

[57] ABSTRACT

The present invention concerns a class of compounds useful as dispersed dyes and insoluble in water, having the general formula (I):

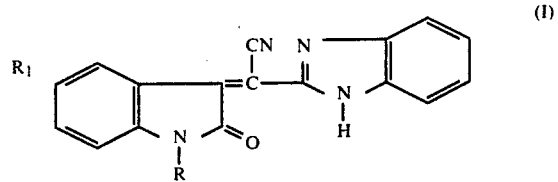

wherein the symbols have the following meaning:
R is selected from the group consisting of an alkyl group having up to 5 carbon atoms, a group —CH$_2$—COOX, wherein X stands for an alkyl group having up to 4 carbon atoms; a group

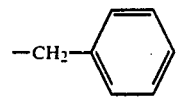

and a group —CH$_2$—CH$_2$—CN; R$_1$ represents an H atom, a halogen atom (preferably Cl or Br) and an NO$_2$ group.

The dyes of this invention, are particularly suited for the dyeing and printing of synthetic fibres, in particular of polyester fibres.

The shades vary from yellow-green to orange. They possess an excellent affinity as well as an excellent fastness to light both in the deep tones as well as in the bright tones.

Good fastnesses are also found against sublimation, to solvents and to washing.

2 Claims, No Drawings

ISATIN-DERIVED DISPERSED DYES

BACKGROUND OF THE INVENTION

As far as we are aware the dyes of this invention are novel compounds as is their use in the dyeing field.

OBJECTS OF THE INVENTION

An object of this invention is to provide a new class of hydroinsoluble dispersed dyes. A further object is to provide a process for the preparation of such novel dyes.

Other objects of this invention will more clearly appear to the skilled in the Art from the description which follows.

GENERAL DESCRIPTION OF THE INVENTION

According to this invention a class of dyes having the formula (I) are prepared by a process characterized in that an isatin derivative of formula (II):

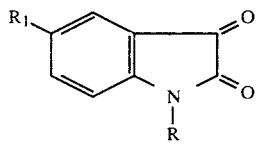

wherein R is selected from the group consisting of an alkyl group having up to 5 carbon atoms, a group —CH$_2$COOX, wherein X stands for an alkyl group having up to 4 carbon atoms, a group

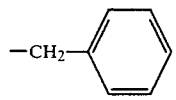

and a group —CH$_2$—CH$_2$—CN: and R$_1$ represents an H atom, a halogen atom (preferably Cl or Br) and an NO$_2$ group, is condensed at a temperature comprised between 60° and 90° C., with 2-benzimidazolyl-acetonitrile. The aforedescribed general method for preparing the novel dyes of this invention is known in the art.

The dyes of this invention are thus obtained by condensation of an isatinic derivative of formula (II):

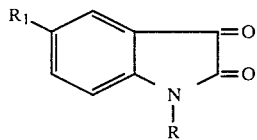

wherein R and R$_1$ have the meaning previously herein above specified, with 2-benzimidazolylacetonitrile, at temperatures comprised between 60° and 90° C., in suitable solvents, for instance acetic acid, chlorobenzene, dichlorobenzene, dimethylformamide, ethyl alcohol.

The isatinic derivatives usable for the purpose more particularly are: N-ethylisatin, N-butylisatin, N-cyanethylisatin, N-benzylisatin, 5-nitor-N-butylisatin.

The N-substituted isatins for formula (II), necessary as intermediate starting compounds, are known products available on the market or can easily be prepared according to known methods such, for example, by condensation of the nonsubstituted isamin, which is a known compound, with a compound of the formula Al-R, wherein Al is an halogen while R has the previously above indicated meaning, in an appropriate solvent e.g. dimethylformamide.

The dyes of general formula (I) are conveniently used as dispersed dyes. In order to be able to use them, they must previously be transformed into suitable tinctorial preparations.

In general such operations can be carried out following known methods, such as for instance by grinding, in the presence of dispersing agents.

Such dispersions, when suitably dried under reduced pressure, may be used after a suitable dilution with water, etc. They are all usually known techniques.

SPECIFIC DESCRIPTION OF THE INVENTION

This invention will be now further described in the following examples given on the other hand for illustrative purposes. Example 8 illustrates an application of the dyes of the invention on polyester fabrics. The given parts and percentages are understood to be by weight unless differently indicated.

EXAMPLE 1

To 30 parts of dimethylformamide there were added 10.15 parts of N-butylisatin and 8.16 parts of 2-benzimidazolylacetonitrile. This mixture was then heated up at 80°–85° C. for 5 hours, under stirring.

The mixture was then allowed to cool down to room temperature, whereupon it was filtered and then dried at 50° C. to a constant weight. Thereby were obtained 14.5 parts of yellow dye that showed the following structure:

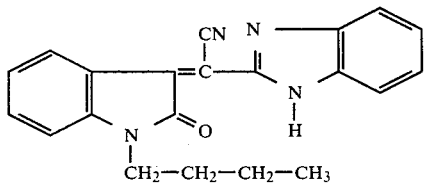

and which, suitably dispersed, dyes polyester fibres in a yellow hue, with good fastnesses to washing, to perspiration, to solvents, to rubbing and particularly to light and sublimation.

N-butylisatin is easily obtained by condensation at 20° C. of 7.35 parts of isatin with 8.9 parts of butyl bromide, in the presence of 3.4 parts of potassium hydroxide and 30 parts of dimethylformamide.

Thereupon, the reaction mass was discharged into water and the product was then filtered, washed with water and dried. There were obtained 10.15 parts of the isatinic intermediate product used for obtaining the above described dye.

Operating in the same way as in example 1, as herein above described, there were prepared the dyes and obtained dyeings showing the characteristics reported in the following table:

| EXAMPLE n° | DYE | Shade on a polyester fibre |
|---|---|---|
| 1 | O₂N—[indoline ring with N-CH₂CH₂CH₂CH₃, =O, =C(CN)—C(=N—C₆H₄—NH)] | yellow |
| 3 | [indoline with N-CH₂CH₂CN, =O, =C(CN)—C(=N—C₆H₄—NH)] | yellow |
| 4 | [indoline with N-CH₂CH₂CH₂CH₂CH₃, =O, =C(CN)—C(=N—C₆H₄—NH)] | yellow |
| 5 | Br—[indoline with N-CH₂CH₂CH₂CH₃, =O, =C(CN)—C(=N—C₆H₄—NH)] | yellow |
| 6 | [indoline with N-CH₂—COOC₂H₅, =O, =C(CN)—C(=N—C₆H₄—NH)] | yellow |
| 7 | O₂N—[indoline with N-CH₂CH₂CH₂CH₂CH₃, =O, =C(CN)—C(=N—C₆H₄—NH)] | yellow |

EXAMPLE 8 (applicational)

In a ball mill there were ground for 48 hours, until fine dispersion is obtained, 1 part of the dye obtained in example 1, 1 part of sodium dinaphthylmethandisulphonate dispersant, 1.5 parts of ethylene glycol and 6.5 parts of water.

The dispersion thus obtained was added in a dyeing bath to about 3000 parts of water at 40°-50° C. Thereupon there were introduced into this bath 100 parts of a polyester fabric preliminarly scoured, after which the bath was slowly brought up to 130° C. and at this temperature the fabric was dyed for 90 minutes.

The bath was then allowed to cool down to 60° C. and the fabric was abundantly rinsed with water, then soaped, once again rinsed with water and finally dried.

There was obtained a uniform dyeing of a yellow shade, particularly fast to light and to sublimation.

We claim:

1. A disperse dye derived from isatin, having the formula;

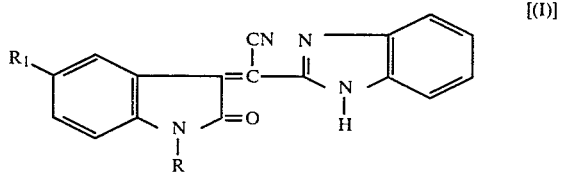

[(I)]

wherein the symbols have the following meanings: R is selected from the group consisting of an alkyl group having up to 5 carbon atoms; a group —CH₂COOX, wherein X stands for an alkyl group having up to 4 carbon atoms; a group

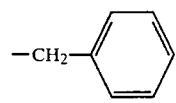
and a group —CH₂—CH₂—CN; and $R_1$ represents an atom of hydrogen, a halogen atom or an $NO_2$ group.

2. A dye according to claim 1, wherein the halogen atom is selected from the group consisting of chlorine and bromine.

* * * * *

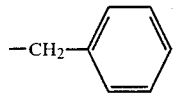
and a group —CH₂—CH₂—CN; and $R_1$ represents an atom of hydrogen, a halogen atom or an $NO_2$ group.

2. A dye according to claim 1, wherein the halogen atom is selected from the group consisting of chlorine and bromine.

* * * * *

UNITED STATES PATENT AND TRADEMARK OFFICE
CERTIFICATE OF CORRECTION

PATENT NO. : 4,198,516
DATED : April 15, 1980
INVENTOR(S) : Fabrizio Merlo and Giorgio Bornengo It is certified that error appears in the above-identified patent and that said Letters Patent are hereby corrected as shown below:

In Col. 6, delete lines 1-10.

Signed and Sealed this

Twenty-sixth Day of August 1980

[SEAL]

Attest:

SIDNEY A. DIAMOND

Attesting Officer

Commissioner of Patents and Trademarks